INVENTOR
Helmut W. M. BRAUN

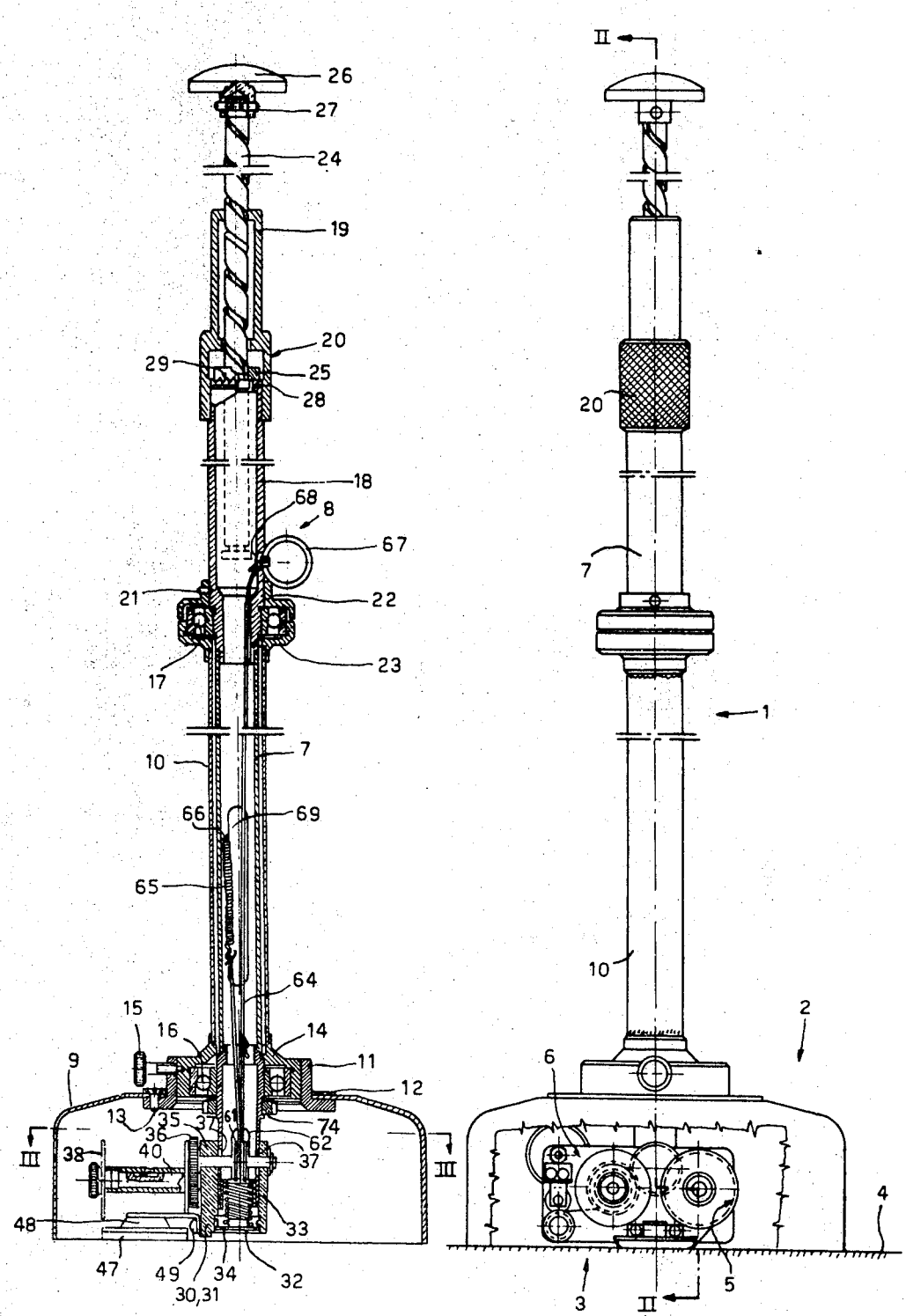

ATTORNEY

# United States Patent Office 3,554,039
Patented Jan. 12, 1971

3,554,039
MANUALLY OPERATED WIPING APPARATUS FOR TAKING WIPED SPECIMENS FROM TEST SURFACES
Helmut W. M. Braun, Cadrezzate, Italy, assignor to European Atomic Energy Community-Euratom, Brussels, Belgium
Filed June 26, 1967, Ser. No. 654,304
Claims priority, application Germany, June 27, 1966, E 31,960
Int. Cl. G01n 1/04
U.S. Cl. 73—425                             10 Claims

ABSTRACT OF THE DISCLOSURE

A manually operated apparatus for taking specimens from a test surface with wiping paper and having a handle and a supporting base attached thereto for positioning the apparatus with the wiping paper surface on the test surface. A reel wind-on mechanism supports the wiping paper which is capable of being paid off in a plane parallel to the test surface. A manually operated drive shaft is rotatably journalled in the supporting base and the reel wind-on mechanism is mounted eccentrically on the end of the shaft which is nearest to the test surface, thus permitting paper surface to move on a circular track around the handle axis. A manually operated means is provided for indexing the reel wind-on mechanism.

---

The present invention relates to the monitoring of surfaces (hereinafter referred to as test surfaces) to determine, e.g., the radioactive contamination of the surface. Such contamination cannot be measured directly, for example by means of counting tubes, but it is accessible to measurement by taking specimens by wiping. During a specimen test, the affected contaminated surface is wiped at a selected position by means of an absorption paper or the like and the activity absorbed by the paper is then measured in a separate counting unit.

One known form of apparatus for taking a specimen consists of a protective cap with travelling mechanism and is provided with a foam rubber pad on whose underside a circular filter paper is secured for taking up the contamination. The apparatus body is directly gripped and operated by hand in the manner of an ink blotter.

Another known type of apparatus comprises a rectangular box housing with traversing unit and a rubbing board extending on the underside from a rectangular opening in the chassis. A perforated card, which is also used as the wiping paper, is positioned over the rubbing board. The wiping distance can be so adjusted that a surface area of 100 sq. cm. is wiped.

Operation of both these known types of apparatus is awkward if extensive surface areas at some distance from the hand, such as corridor and room floors, have to be monitored on a routine basis, because the operator must continually bend to the floor in order to execute a wiping action and furthermore must insert (after taking each specimen) a new wiping paper into the apparatus.

According to the invention a manually operated apparatus for taking specimens from test surfaces by wiping comprises a handle having an operating head and a wiping paper mounted thereon characterized in that the wiping paper, in the form of a paper reel capable of being paid-off in a plane which is parallel to the test surface, is contained in a reel wind-on mechanism operating in the manner of a photographic camera film wind-on mechanism, in that the handle comprises a supporting base for positioning the apparatus with the wiping paper surface on the test surface, and in that the apparatus is provided with a manually operated drive shaft rotatably journalled in the supporting base, the reel wind-on mechanism being mounted eccentrically on that end of the shaft which is nearest to the test surface, thus permitting the wiping paper surface to move on a circular track around the handle axis, and manually operated means (e.g., a pull rope) for indexing the reel wind-on mechanism.

This construction of apparatus enables a large number of wiping specimens to be taken without changing wiping sheets and without executing any manual wiping action. The apparatus also greatly facilitates the taking of specimens by wiping and rationalises this operation for measuring purposes.

In the preferred form of the invention, the reel wind-on mechanism is resiliently mounted on the end of the drive shaft, in the axial direction of the shaft. This ensures that the contact pressure of the wiping paper is independent of the hand pressure when the working head is placed upon the test surface, that is to say it is determined solely by the prestress to which the apparatus is adjusted.

It is also preferred that the reel wind-on mechanism comprises two ratchet locked take-up and pay-off drums serially disposed in one plane, an indexing wheel, a reversing pulley and a rubbing board mounted in a parallel plane below the drums on the chassis of the apparatus, said rubbing board being disposed tangentially relative to the drive shaft in a plane disposed perpendicularly to the shaft axis, i.e., the rubbing board is disposed in a plane parallel to that of the test surface.

In the operating zone of the reel wind-on mechanism, the supporting base is preferably constructed as a bell from which the rubbing board extends when the apparatus is relieved of thrust, while the supporting base above the bell is constructed as a fixed tubular extension. In this case, the more sensitive kinematic part of the apparatus is protected against touching while at the same time the apparatus is provided with stability.

It is also preferred that the drive shaft is constructed as a tube which is rotatably journalled in the tubular extension of the supporting base and which extends from the tubular extension, the tube also being provided with a free-fitting drive spindle of which one end engages a drive nut disposed in the interior of the drive shaft and the other end is provided with a hand knob. The circular wiping motion of the apparatus is thus initiated in the simple manner adopted for and known per se in the construction of a musical humming top, namely by pushing and pulling the drive spindle.

It is further preferred that the drive nut is loosely journalled on a ring shoulder in the drive shaft, the shoulder and nut being provided with coupling teeth acting on one side, at which side the shoulder and nut are in physical contact (i.e., the operating side).

Preferably the above-mentioned pull rope is located in the interior of the hollow drive shaft, the rope having one end secured to a helical spring anchored within the drive shaft, the rope then being guided by non-positive means over a drive wheel for the indexing wheel of the reel wind-on mechanism and having its free end secured to a finger eyelet disposed outside the handle. Owing to the pull exerted by the helical spring, the eyelet is urged towards the handle. Also, simple upward pulling of the rope causes a fresh section of the wiping paper to be brought into the rubbing position.

A further preferred feature is that the indexing wheel is provided with a drive shaft disposed in suitably located slots in the drive shaft of the reel wind-on mechanism, the said reel wind-on mechanism thereby being retained against rotation relative to its drive shaft.

The apparatus is also preferably provided with a trunnion lever transmission system which causes the reversing pulley of the reel wind-on mechanism to operate an alarm gong mounted on the chassis after each full rotation of the reel wind-on mechanism around the handle axis. This indicates to the operator that a fresh section of wiping paper has been advanced onto the rubbing board.

By way of example, a specific form of apparatus for taking specimens from surfaces by wiping in accordance with the invention will now be described with reference to the accompanying drawings in which:

FIG. 1 is a side elevation of the apparatus with the supporting base wall being partially being partially broken away;

FIG. 2 is a section along the line II—II in FIG. 1;

Figure 3:
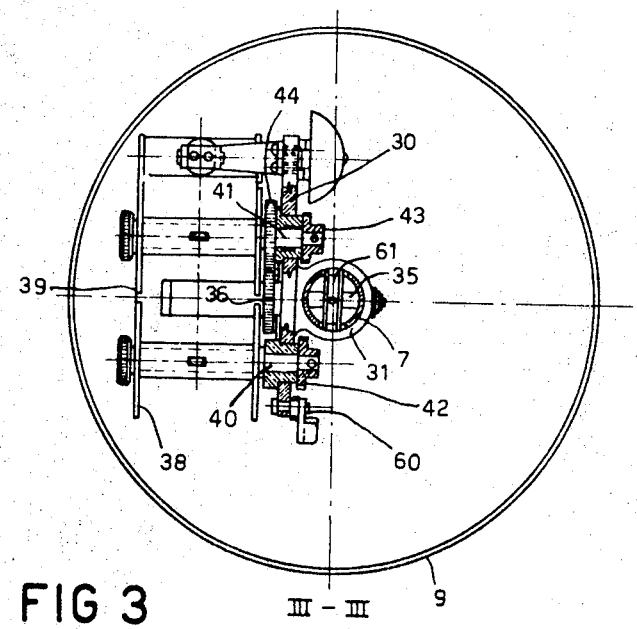
FIG. 3 is a section along the line III—III in FIG. 2.

With reference to FIG. 1, the apparatus comprises a handle 1 with an operating head 2 and wiping paper 3 secured thereon. According to the invention, the wiping paper provided on a paper reel 5 capable of unwinding in a plane which is parallel to the test surface 4, is contained in a reel wind-on mechanism 6 of the kind employed in photographic camera film wind-on mechanism. The handle consists of a supporting base for positioning the apparatus with the wiping paper surface on the test surface, and a manually operated drive shaft 7 rotatably journalled in the supporting base. According to FIG. 3, the reel wind-on mechanism is eccentrically mounted on that end of the drive shaft which is nearest to the test surface thus permitting movement of the wiping paper surface on a circular track around the handle axis. The apparatus is also provided with a manually operated pull rope 8 for indexing the reel wind-on mechanism (see FIG. 2).

In the operating zone of the reel wind-on mechanism, the supporting base is constructed as a bell 9 (see FIG. 2), while above the bell, it is constructed as a fixed tubular extension 10. The mechanical connection between the bell and the tubular extension is provided by the elements 11 to 15 of which the numeral 11 refers to a sleeve, the numeral 12 to a ring flange, the numeral 13 to one of a plurality of countersunk screws which secure the bell on the ring flange and the sleeve, the numeral 14 refers to a bearing bush welded to the tubular extension and the numeral 15 refers to a locking screw securing the bell on the tubular extension.

The drive shaft 7 taking the form of a tube, is journalled in ball bearings 16 and 17 provided in the tubular extension and in the bell. The drive shaft is also extended at the top by a tubular section 18 which extends from the pipe extension 10 and forms a hand guard. A spindle guide bush 19, being provided on the exterior with knurling 20 (see FIG. 1) to improve its grip, is screw-mounted onto the pipe section 18.

At the level of the ball bearing 17, the pipe section 18 is provided with a collar 22 secured by a grub screw 21, said collar covering a fixed bearing bush 23 at the upper end of the pipe extension 10.

A free-fitting drive spindle 24 is journalled in the spindle guide bush 19. One end of the said spindle is engaged with a drive nut 25. At its upper free end, the said spindle is provided with a hand knob 26 which is secured by a pin 27. The drive nut 25 bears loosely on an annular shoulder 28 within the drive shaft. The shoulder 28 and the nut 25 are provided with coupling teeth 29 acting on one side on which they are in physical contact. The pressing of the drive spindle causes the drive shaft to rotate while the bell 9 and the tubular extension 10 remain stationary. The lowest operating position of the drive spindle is shown in broken lines in FIG. 2.

The construction of the reel wind-on mechanism provided at the lower end of the drive shaft will now be described.

With reference to FIG. 2, the reel wind-on mechanism is resiliently journalled on the end of the drive shaft, in the axial direction of the shaft. To this end, the chassis of the reel wind-on mechanism comprises an anchoring plate 30 and a guide bush 31, said guide bush being slidingly mounted on the end of the drive shaft 7. The lower end of the guide bush has a screwthread cut into it, into which screwthread a screwthread cover 32 is screwed, while a hollow plug 33 is welded into the lower end of the drive shaft 7. The free bush space thus obtained has a helical spring 34 loosely inserted into it, the prestress of said spring being adjustable by the screwthreaded cover 32.

The helical spring 34 exerts thrust onto the guide bush 31 of the reel wind-on mechanism in the direction of the test surface. The thrust displacement is limited by the drive shaft 35 of an indexing wheel 36 of the reel wind-on mechanism, since the aforementioned shaft extends through diametrically opposed slots 37 in the drive shaft 7 and is journalled in the guide bush 31. At the same time this arrangement ensures that the reel wind-on mechanism is retained on the drive shaft against relative rotation therewith.

The reel wind-on mechanism itself comprises two take-up and pay-off drums 38 and 39 of known construction whose shafts 40 and 41 are rotatably journalled in the anchoring plate 30 and are secured by toothed collars 42 and 43 (see FIG. 3). On the anchoring plate side, the take-up drum 39 is provided with a drive pinion 44 which is in engagement with the aforementioned indexing wheel 36 of the reel wind-on mechanism.

In the plane below the take-up and pay-off drums and as particularly clearly indicated in FIG. 5, a reversing pulley 45 is rotatably journalled on the anchoring plate and is secured in position by a collar 46. A rubbing board 47, constituting the wiping surface and a guide for the wiping paper, is disposed in the zone between the drums (see FIG. 1). The wiping board is also secured on the anchoring plate via the resilient strut 48 by means of screws 49, 50.

Figure 4:
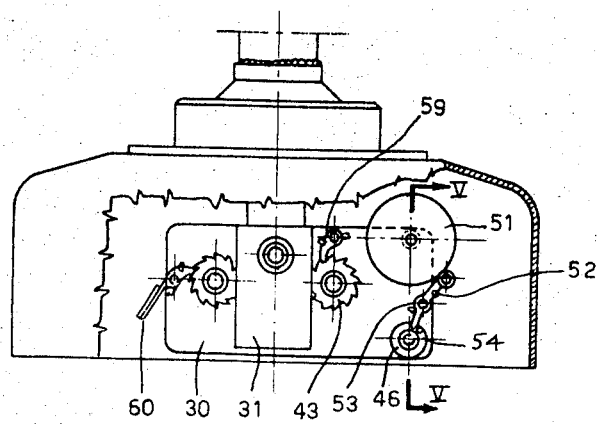
FIG. 4 is a view of the supporting base of the apparatus shown in FIG. 1 seen from behind with respect to FIG. 1 and having part of the supporting base wall broken away.
Figure 5:
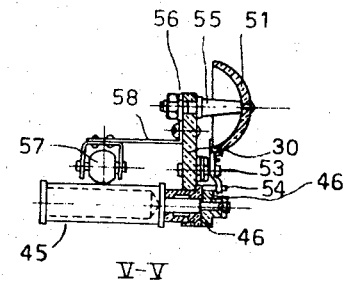
FIG. 5 is a section through the reel wind-on mechanism of the apparatus shown in FIG. 1, along the line V—V in FIG. 4.

Furthermore, and as shown in FIGS. 4 and 5, a gong mechanism is mounted on the anchoring plate in the zone of the reversing pulley, said gong mechanism comprising a gong 51 and a striker 52. The striker is hinged on a pin 53 and is operated by an extension 54 disposed on the collar 46. The gong is retained on the anchoring plate by a bolt 55 and secured by a nut 56.

The reversing pulley (see FIG. 5) is provided with retaining means comprising a thrust roller 57 and a resilient retaining strut 58. The thrust roller rolls with light pressure upon the reversing pulley.

The take-up and pay-off drums of the reel wind-on mechanism are secured on the rear of the anchoring plate by means of toothed collars as already mentioned above. The construction of the toothed collars 42 and 43 as locking wheels is clearly shown in FIG. 4. The said collars cooperate with locking levers 59 and 60 in the sense of a ratchet drive to prevent reversing of the spools. As shown more clearly in FIG. 3, the locking levers are also journalled on the anchoring plate 30. Wind-on of the wiping paper is initiated by the aforementioned indexing wheel 36, to which end its shaft 35 is provided with an inward-driving rope drive wheel 61 disposed centrally on the drive shaft. Fitting of the rope drive wheel is facilitated by the longitudinal opening 62 in the drive shaft. In the zone of the lower ball bearing 16, the drive shaft is also provided with an external screwthread 63 on which the screwthreaded collar 74 is screwed to secure the inner race of the aforementioned ball bearing.

A pull rope 64, installed within the drive shaft 7, is guided over the rope drive wheel 61. At one end the rope is secured to a helical spring 65 which is anchored in the drive shaft by a pin 66. At its other end the rope is secured to a finger eyelet 67 which bears under the effect of the pull exerted by the helical spring 65 inside the drive shaft—in the zone of the rope entry bore 68— upon the external wall of the shaft. Installation of the aforementioned spring is facilitated by a slot 69 in the drive shaft 7 at the level of the aforementioned helical spring. A fresh length of wiping paper will have been advanced onto the rubbing board when the gong sounds.

Handling and the method of operation of the apparatus will now be described. The apparatus is placed upon the surface to be tested. The rubbing board presses the operative length of wiping paper at the preset contact pressure on to the test sorface, the said length of wiping paper having been made to extend from the bell in the direction of the test surface. Depressing the operating spindle once or several times causes the rubbing board to be rotated around the axis of symmetry of the apparatus (i.e., the handle axis) and the wiping paper thus absorbs a corresponding quantity of surface deposits. Pulling the pull rope of the apparatus causes the covered part of the wiping paper to be taken up, while a fresh length is pulled forward.

The wiping paper is provided on one side with a detachable separating film which prevents contamination being transmitted from one layer to the next in that part of the paper reel which is coiled up.

The great advantage of the apparatus described hereinbefore is that the large number of specimen samples required, for a monitoring cycle to be statistically evaluated, can actually be obtained in practice because the wiping operations will have been performed free from fatigue.

Furthermore, essential conditions relating to the evaluation and comparability of the specimens are obtained, particularly the maintenance of a constant contact pressure and of a constant wiping surface area.

The embodiments of the invention in which an exclusive property or privilege is claimed are defined as follows:

1. Manually operated apparatus for taking specimens from a test surface with wiping paper comprising:
    (a) a handle and a supporting base attached thereto for positioning the apparatus with the wiping paper surface on the test surface;
    (b) a reel wind-on mechanism supporting the wiping paper which is capable of being paid off in a plane parallel to the test surface;
    (c) a manually opreated drive shaft rotatably journalled in the supporting base, the reel wind-on mechanism being mounted eccentrically on the end of the shaft which is nearest to the test surface, thus permitting the wiping paper surface to move on a circular track around the handle axis; and
    (d) manually operated means for indexing the reel wind-on mechanism.

2. Apparatus as defined in claim 1 in which the manually operated means for indexing the reel wind-on mechanism is a pull rope.

3. Apparatus as defined in claim 1 further comprising means for resiliently mounting the reel wind-on mechanism on the end of the drive shaft, in the axial direction of the shaft.

4. Apparatus as defined in claim 1 in which the reel wind-on mechanism comprises an anchoring plate, two ratchet locked tape-up and pay-off drums serially disposed in the plane on said anchoring plate, an indexing wheel for winding said take-up drum, a reversing pulley and a rubbing board mounted on said anchoring plate in a plane parallel to said one plane below the drums, said rubbing board being disposed tangentially relative to the drive shaft in a plane disposed perpendicularly to the shaft axis.

5. Apparatus as claimed in claim 4, in which the indexing wheel of the reel wind-on mechanism is provided with a drive shaft disposed in suitably located slots in the drive shaft of the reel wind-on mechanism, the drive shaft of said indexing wheel retaining said reel wind-on mechanism against rotation relative to its drive shaft.

6. Apparatus as claimed in claim 4 further comprising an alarm gong mounted on said anchoring plate and a trunnion lever transmission system coupled to said reversing pulley to cause the reversing pulley on the reel wind-on mechanism to operate said alarm gong after each full rotation of the reel wind-on mechanism around the handle axis.

7. Apparatus as defined in claim 4 in which, in the operating zone of the reel wind-on mechanism, the supporting plate is constructed as a bell from which the rubbing board extends when the apparatus is relieved of thrust, while the supporting base above the bell is constructed as a fixed tubular extension.

8. Apparatus as defined in claim 7 in which the drive shaft is constructed as a tube which is rotatably journalled in the tubular extension of the supporting base, and which extends from the tubular extension, the tube also being provided with a free-fitting drive spindle of which one end engages a drive nut disposed in the interior of the drive shaft and the other end is provided with a hand knob.

9. Apparatus as defined in claim 8 in which the drive nut is loosely journalled on a ring shoulder in the drive shaft, the shoulder and nut being provided with coupling teeth acting on one side, at which side the shoulder and nut are in physical contact.

10. Apparatus as defined in claim 8 wherein said manually operated means in a pull rope located in the interior of the hollow drive shaft and having one end thereof secured to a helical spring anchored within the drive shaft, and further comprising a drive wheel disposed centrally on the drive shaft for operating the indexing wheel, the rope being guided by non-positive means over said drive wheel and having its free end secured to a finger eyelet disposed outside the handle, said eyelet being urged towards the handle by said spring at the other end of the rope.

References Cited

UNITED STATES PATENTS 3,066,342  12/1962  Jackson et al. _____ 73—425UX
3,074,276  1/1963  Moos _____ 73—425
3,091,967  6/1963  Hurdlow et al. _____ 73—425

S. CLEMENT SWISHER, Primary Examiner

U.S. Cl. X.R.

15—104